March 27, 1945. F. HAUSER 2,372,324
AUTOMATIC SPRINKLING SYSTEM
Filed Jan. 17, 1944 4 Sheets-Sheet 1
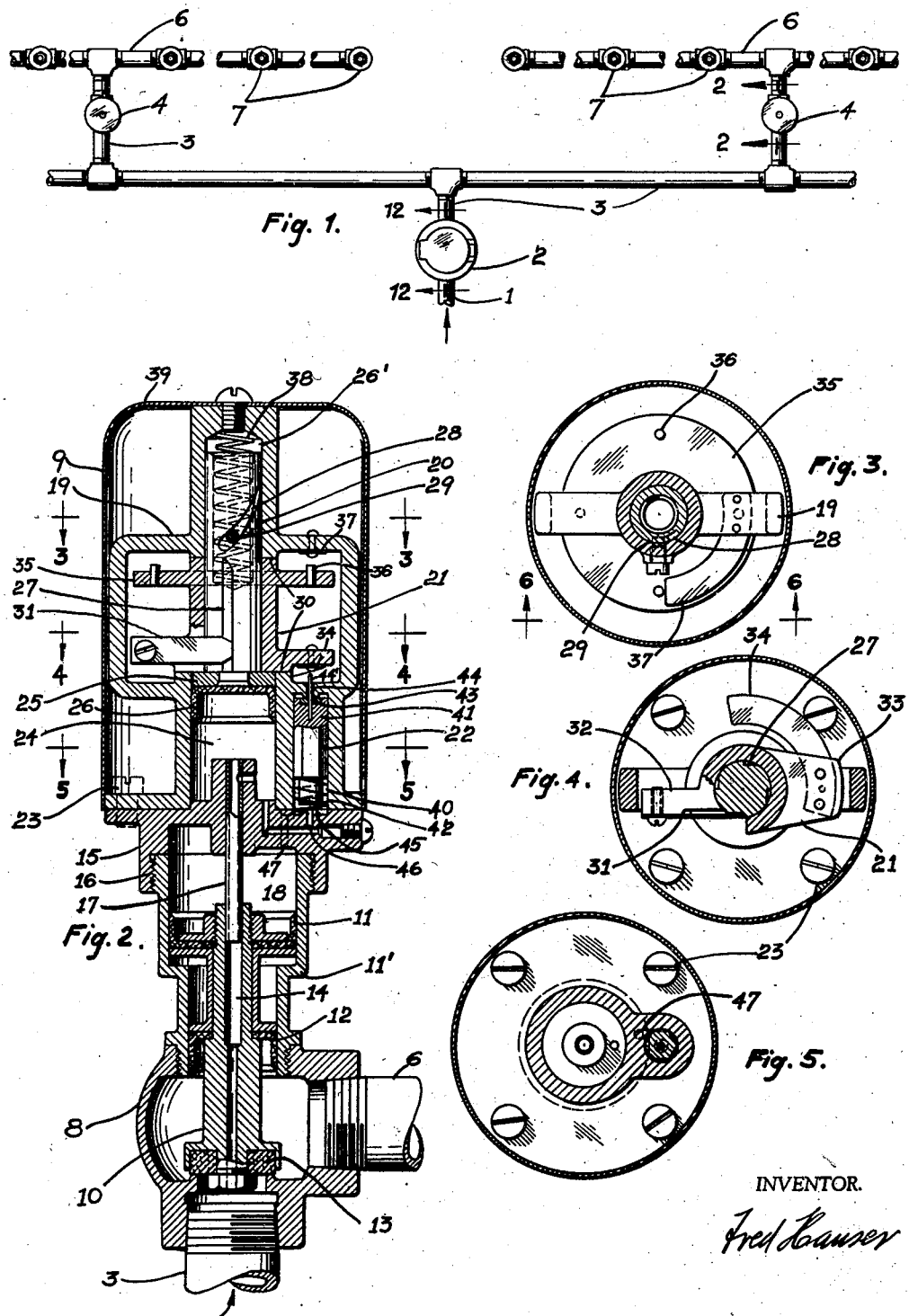
INVENTOR.
Fred Hauser March 27, 1945. F. HAUSER 2,372,324
AUTOMATIC SPRINKLING SYSTEM
Filed Jan. 17, 1944 4 Sheets-Sheet 2

INVENTOR.
Fred Hauser

March 27, 1945.                F. HAUSER                      2,372,324
                        AUTOMATIC SPRINKLING SYSTEM
                        Filed Jan. 17, 1944         4 Sheets-Sheet 3

INVENTOR.
Fred Hauser

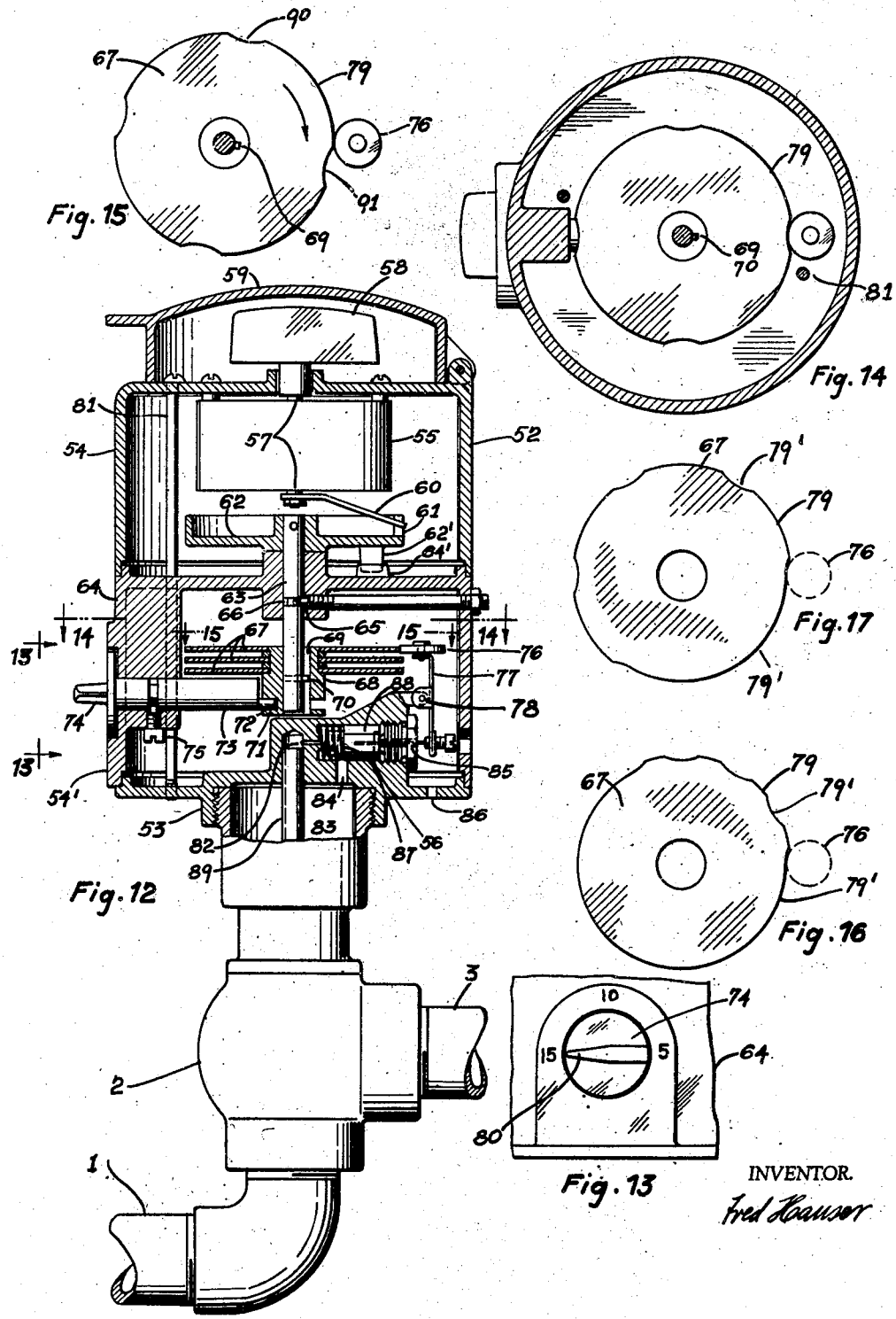

Patented Mar. 27, 1945

2,372,324

UNITED STATES PATENT OFFICE 2,372,324

AUTOMATIC SPRINKLING SYSTEM

Fred Hauser, Los Angeles, Calif.

Application January 17, 1944, Serial No. 518,530

11 Claims. (Cl. 161—7)

This invention pertains to improvements in systems for sequential operation of service valves and is also directed to improvements and devices whereby such service valves controlling fluid under pressure may be operated by hydrostatic pressure differences created in the control pipe to which they are connected. Systems of this general type are most often used in irrigating lawns of private residences, parks and orchards. They frequently consist of several groups of branch pipes, each group being provided with a plurality of sprinkler heads and being connected to a service valve which in turn is connected to a control pipe in which the hydrostatic pressure difference is created. The service valves are operated in sequence, there being never more than one valve open at any one time. The control pipe is connected to the water main by means of a control valve which is operated by a timing device attached thereto. The timing device may be manually wound thereby instituting a sprinkling cycle.

A further object of the present invention is to provide a combination of elements whereby several time periods during which the service valves are open may be selectively attained by operating a dial provided for this purpose. Such arrangement results in sprinkling periods of varying duration.

Heretofore sprinkling systems have been evolved in which the service valves were operated by means of pressure fluid carried in control tubings running from one central distributor head to each and every one of said service valves. The present invention distinguishes from these prior attempts in that it employs no such control tubings but relies on establishing pressure differences in the water pipe leading to said service valves and utilizes this pressure difference to operate said valves in sequence.

Other objects of this invention and advantages thereof will be apparent from the following description of an illustrative embodiment of the invention.

Reference will be made to the appended drawings, in which

Fig. 1 is a plan view, diagrammatic in general form, of a sprinkling system installation consisting of a system of branch pipes provided with sprinkler heads, service valves and a control valve.

Fig. 2 is a vertical section through a service valve taken along the plane 2—2 of Fig. 1.

Fig. 3 is a horizontal section taken along the plane 3—3 of Fig. 2.

Fig. 4 is a horizontal section taken along the plane 4—4 of Fig. 2.

Fig. 5 is a horizontal section taken along the plane 5—5 of Fig. 2.

Fig. 12 is a vertical section through the control head taken along the plane 12—12 of Fig. 1 with the control valve shown in elevation.

Fig. 13 is a partial elevation of the control head showing the timing dial, and taken along the plane 13—13 of Fig. 12.

Fig. 14 is a horizontal section taken along the plane 14—14 of Fig. 12.

Fig. 15 is a horizontal section taken along the plane 15—15 of Fig. 12, and showing one of the timing discs at the beginning of a sprinkling period.

Figs. 16 and 17 are plan views of additional timing discs.

Figure 7:
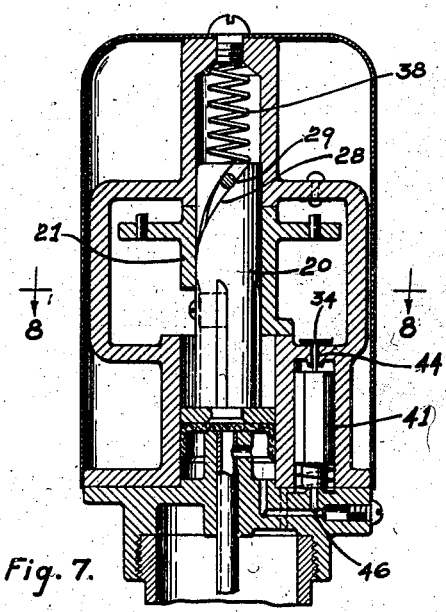
Fig. 7 is a partial vertical section through a service valve with the indexing plunger in the extreme down position.

Referring to the drawings, I have illustrated my invention in general form in Fig. 1. Water from the main 1 enters the control valve 2, to which is connected the control pipe 3. The service valves 4 in the system are all connected to this control pipe. Two such service valves are shown in Fig. 1. Each group of branch pipes 6 in turn is connected to a service valve 4. The sprinkler heads 7 are mounted on the branch pipes 6.

Fig. 2 is a vertical section through a service valve 4 and shows the valve in a closed position. The valve consists of two main parts, the lower part which is the valve 8, and the upper part which is the valve actuating head 9. Generally stated the valve 8 is of the differential piston type, hydraulically operated, and includes a valve member 10 provided with a large piston including the cup leather 11, and with a smaller piston including the cup leather 12, and with the valve disc 13. The hole 11' connects the space between the two pistons to the atmosphere. A longitudinal bore 14 runs the entire length of the valve member 10. The valve cover 15 is secured to the valve 8 by means of the thread 16. A tubing 17 is soldered into the cover 15 and projects downward into the upper portion of the bore 14, forming a fluid tight fit in said bore, thus sealing the bore 14 from the chamber 18, but permitting the valve member 10 to move up and down.

Figure 6:
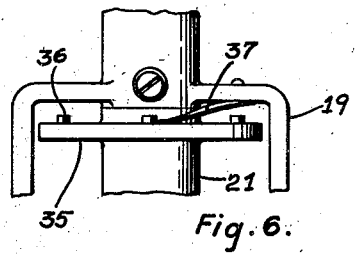
Fig. 6 is a partial elevation of a service valve with the cover removed, and taken along the plane 6—6 of Fig. 3.

The valve actuating head 9 consists primarily of the frame 19, the indexing plunger 20, the rotating member 21 and the pilot valve 22. The frame 19 is bolted to the cover 15 by means of the screws 23. The lower part of the frame 19 is provided with a cylindrical chamber 24 which houses a piston consisting of the disc 25 and the cup leather 26, both arranged to move up and down in the chamber 24. The disc 25 is pressed onto the lower end of the indexing plunger 20. The upper portion of the indexing plunger 20 is housed in the bore 26' of the frame 19. Said plunger is also provided with a plurality of axially extending ratchet teeth 27 (shown also in Fig. 4), and is further provided with a helical groove 28. A stationary pin 29 (see also Fig. 3) engages the groove 28 at all times and causes the indexing plunger 20 to rotate back and forth as it moves up and down. The rotating member 21 is held axially between the faces 30 of the frame 19 but is arranged to rotate freely around the indexing plunger 20. A leaf spring 31 (Figs. 2 and 4) is secured to a projection 32 of the rotating member 21 and is arranged to engage the ratchet teeth 27. On another projection 33 there is mounted the crescent shaped leaf spring 34. The upper portion of the rotating member 21 is shaped like a disc 35, into which are pressed a plurality of pins 36 (Figs. 2, 3, and 6). The number of pins is identical with the number of ratchet teeth 27, and they are arranged to engage the leaf spring 37 (Fig. 6) fastened to the frame 19. A helical spring 38 exerts a constant downward pressure on the indexing plunger 20. The hood 39 serves to protect the mechanism from dirt and rough usage.

The pilot valve 22 consists of the vertical bore 40, the valve member 41 and the spring 42. The upper end of the bore 40 terminates in the valve seat 43 formed around the bleeder port 44. A small stem 44' pressed into the valve member 41 protrudes through the bleeder port 44. The lower end of the bore 40 is provided with another valve seat 45 formed around the pressure port 46 which port communicates with the chamber 24. A third port 47 (Figs. 2 and 5) connects the bore 40 at all times to the chamber 18. The valve member 41 is of polygon cross section, while the bore 40 in which the former is housed is round, thereby permitting fluid to flow from the ports 46 or 47 to the bleeder port 44.

Figure 10:
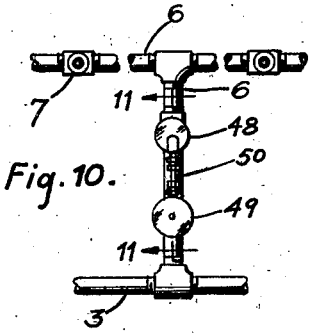
Fig. 10 is a modified form of a service valve showing the valve actuating head separated from the valve and mounted to the control pipe.
Figure 11:
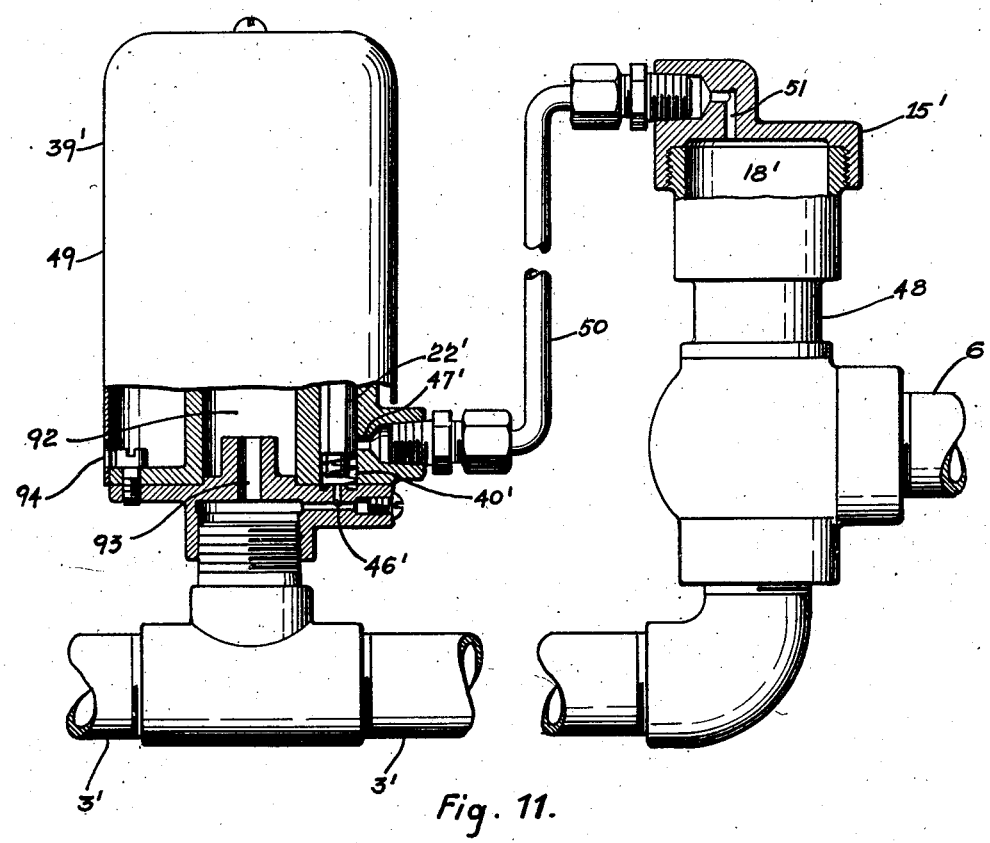
Fig. 11 is a partial vertical section through the service valve and the valve actuating head taken along the plane 11—11 of Fig. 10.

Figs. 10 and 11 represent a modified form of service valve in which the service valve 48 and the valve actuating head 49 are mounted individually on the control pipe 3' and are connected to each other by a tubing 50. Fig. 10 is a plan view and Fig. 11 is a vertical cross section of said modified form. The service valve 48 is constructed and operates essentially the same as the valve 8 shown in Fig. 2 except that the bore 14 in the valve member 10 (Fig. 2) is eliminated, and the cover 15 in valve 8 is replaced by the new cover 15'. The valve actuating head 49 also is similar to its counterpart 9 in Fig. 2, except that it is mounted directly on the control pipe 3' from which it receives its supply of pressure fluid. The pilot valve 22' is operated in identical manner as is the pilot valve 22 in Fig. 2. Pressure fluid is supplied to the bore 40' from the pipe 3' through the pressure port 46'. The port 47' connects the bore 40' at all times to the chamber 18' of the service valve 48 by means of the tubing 50 and the bore 51 in the cover 15'. The remainder of the mechanism in the valve actuating head 49 is identical with the one in the head 9 in Fig. 2.

Fig. 12 is a vertical cross section through the control head 52 which is attached to the control valve 2. The control valve 2 is identical in construction and operation with the valve 8 shown in Fig. 2. However the cap 15 of the valve 8 is replaced by the cap 53 which also serves as the base for the control head 52. Said control head 52 consists of two main sections, the upper section as indicated at 54 contains the motor means such as the spring clock motor 55, and the lower section, indicated at 54', which houses the pilot valve 56 and the pilot valve actuating mechanism. The motor 55 consists of a standard clock mechanism and is characterized by the frictional mounting of the main drive shaft 57, whereby the same may be manually rotated in either direction to wind or unwind the main spring of the clock mechanism. The motor is wound or energized by turning the hand knob 58 attached to the main drive shaft 57 in counter-clockwise direction. A pivoted cover 59 mounted on top of the upper section 54 protects the clock mechanism from the elements. The lower end of the main drive shaft 57 is provided with an arm 60, the end thereof being received in a slot 61 of the wheel 62. The wheel 62 is attached to one end of the shaft 63 which is journaled in the upper part of the housing 64 and is held in axial alignment by the screw projection 65 entering the circular groove 66. The projection 62' on the wheel 62, and the projection 64' on the housing 64 are for the purpose of limiting the rotary motion of the wheel 62 to somewhat less than one revolution. The lower end of the shaft 63 carries the three timing discs 67, all mounted to a common hub 68, which hub may be moved up and down on the shaft 63 but is held in radial fixed relation to said shaft by means of the keyway 69 and the pin 70. A circular groove 71 in the hub 68 is engaged by the crank pin 72 of the timing shaft 73. The other end of the timing shaft 73 is formed into a disc and hand knob 74. The dog screw 75 engaging a groove in the shaft 73 provides the axial alignment for said shaft. Upon turning the hand knob 74, any one of the three timing discs 67 may be moved into position directly opposite the roller 76 and contacting same. Figures 15, 16 and 17 are plan views of the timing disc 67. The periphery of these timing discs represent cam surfaces, by means of which the arm 77 to which the roller 76 is mounted may be pivoted around its fulcrum 78. Each cam surface consists of four lobes 79, but of varying length, the disc illustrated in Fig. 16 having the shortest lobes and the one in Fig. 15 the longest. The length of these lobes, as will be explained later, represent the time intervals during which the service valves 4 are open, in other words the sprinkling time. The numerals embossed on the outside of the housing 64 (Fig. 13) represent such sprinkling time. More explicitly stated: whenever the pointer 80 is opposite the numeral 10, then the timing disc illustrated in Fig. 17 is actuating the arm 77, while the numerals 5 and 15 represent the sprinkling time produced by the discs illustrated in Figs. 16 and 15 respectively. The two sections of the control head are bolted to the cap 53 by means of the bolts 81.

The arm 77 actuates the pilot valve 56, which is of identical construction as the one in the actuating head of the service valve 4. Pressure fluid enters by the pressure port 82 and may from there enter the chamber 83 by way of the port 84, or if the port 82 is closed, fluid in the chamber 83 may empty into the atmosphere by way of the bleeder port 85 and the opening 86 in the cap 53. The spring 87 exerts a constant pressure on the valve member 88 in the direction of the bleeder port 85, and closes this port whenever the roller 76 contacts the low portions 79' of the cams 67. The tubing 89 is soldered into the cap 53 and serves the same purpose as does the tubing 17 in the service valve 4.

Normally, when none of the service valves 4 of the system is open, the timing discs 67 and the roller 76 of the control head 52 are in a relative position as shown in Figs. 16 and 17, that is the roller is opposite the low portion 79' of one of the three timing discs 67. The bleeder port 85 of the pilot valve 56 is then closed and the pressure fluid from the main 1 may enter through the tubing 89, the pressure port 82 and the port 84 into the chamber 83 and keep the control valve 2 closed, and no such pressure fluid may enter the control pipe 3. All but one of the valves 8 are then closed as illustrated in Fig. 2, but the valve having last operated in the previous sprinkling cycle may be partly open or also closed. The mechanisms of the valve actuating heads 9 is at that time in the position shown in Fig. 7, with the exception that the bleeder port 44 is open on only one of the heads, being closed on the others, as shown in Fig. 2.

Figure 8:
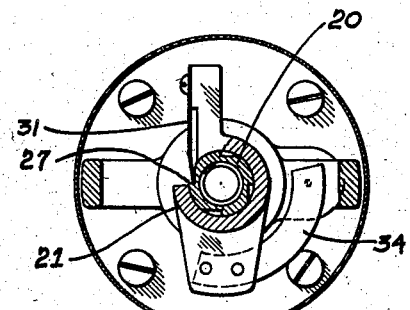
Fig. 8 is a horizontal section taken along the plane 8—8 in Fig. 7.
Figure 9:
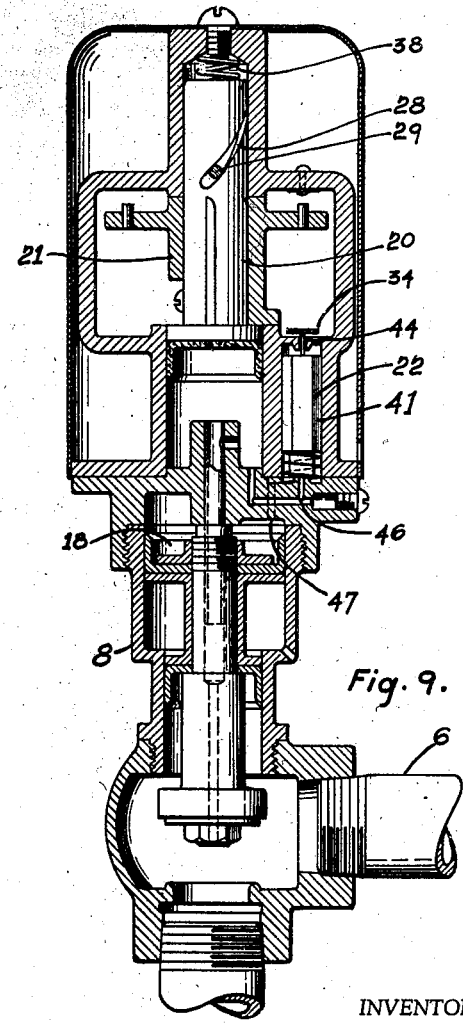
Fig. 9 is another vertical section through a service valve with the valve open.

The sprinkling operation may be instituted by turning the hand knob 58 in counter-clockwise direction as far as possible or actually slightly less than one full revolution. This brings the one of the three timing discs 67 which at that time is opposite the roller 76 into a position illustrated in Fig. 15. Immediately upon releasing the hand knob 58 by the person operating same the clock 55 starts running in clockwise direction, or opposite the winding direction, driving the discs 67 at a slow rate in a direction as indicated by the arrow in Fig. 15. The roller 76 is then riding on the lobe 79, of the timing disc, and the valve member 88 of the pilot valve 56 is depressed by the arm 77, thereby closing the pressure port 82 and opening the bleeder port 85. This permits pressure fluid in the chamber 83 to escape through the port 84 and the bleeder port 85 into the atmosphere. The valve member (not shown) in the control valve 2 is then forced upward by the pressure in the main 3 and the valve opens, permitting pressure fluid to reach the control pipe 3. The indexing plunger 20 in each of the valve actuating heads 9 is moved upward by virtue of the action of the pressure fluid reaching the chamber 24 through the bore 14 and the tubing 17, at the same time compressing the spring 38. In its upward travel the indexing plunger 20 is caused to rotate in a counter-clockwise direction (viewing the head from the top) by reason of the helical groove 28 being engaged by the stationary pin 29. The rotating member 21 however is held stationary due to the leaf spring 37 (Fig. 6) contacting one of the pins 36. Since the leaf spring 31 (Fig. 4) is secured to a projection of the rotating member 21 said spring too is held stationary, but the indexing plunger 20, being rotated as above stated is bringing the succeeding tooth of the ratchet teeth 27 into contact with said spring 31. In all but one of the service valves 4 the pilot valves 22 and the valve members 10 are in relative positions as illustrated in Fig. 2. Pressure fluid in those valves may enter the chamber 18 through the bore 14, the tubing 17, the pressure port 46 and the port 47 thus keeping the service valves 4 closed. In one of the service valves however the leaf spring 34 is depressing the valve member 41 of the pilot valve 22 (Fig. 9), and thereby opening the bleeder port 44 and closing the pressure port 46. In this particular service valve the chamber 18 is then connected to the atmosphere and pressure fluid from said chamber may escape through the port 47 and the bleeder port 44. This causes this valve to open, and the branch pipe 6 connected to it will receive pressure fluid which is released into the atmosphere through the sprinkler heads 7 mounted to this branch pipe. This marks the beginning of the sprinkling operation. The duration of the latter is governed by the time required for the notch 90, Fig. 15, of the slowly rotating timing disc 67, to move opposite the roller 76. If the clock 55 makes one revolution per hour and the timing disc has four equally spaced notches then the sprinkling period would be approximately 15 minutes. At the end of this 15 minutes, when the notch 90 reaches the roller 76 the valve member 88 of the pilot valve 56 closes the bleeder port 85 and opens the supply port 82. This causes the pressure fluid to again reach the chamber 83 of the control valve 2 and to close said valve. As the control pipe 3 is cut off from its supply of pressure fluid the hydrostatic pressure in said pipe drops to atmospheric pressure, and the indexing plungers 20 in all the valve actuating heads 9 are descending under the influence of the spring 38. In so doing the indexing plungers 20 (Fig. 8) rotate in a clockwise direction and advance the rotating members 21 by a fraction of a revolution, that is by one ratchet tooth (in the case illustrated, by ¼ of a revolution) due to the contact of the ratchet teeth 27 with the leaf springs 31.

It should be stated here, that in every system the rotary members 21 are positioned in such a way that the leaf springs 34 are all in different angular position in relation to the pilot valve 22. It follows therefore that by the above mentioned rotation of the rotating members 21, a pilot valve 22 belonging to the succeeding actuating head in the system will be depressed by the leaf spring 34. As soon as the notch 90 of the timing disc 67 passes the roller 76 and moves same to the right the control valve 2 is again opened, and pressure fluid may again reach the control pipe 3. This time another service valve 4, namely the one which has its pilot valve depressed will open, while the rest of the said service valves will remain closed.

In this manner all the service valves 4 will ultimately operate, one at the time, and the timing disc 67 Fig. 15 will finally come to rest with the notch 91 directly opposite the roller 76, being stopped there by reason of the projection 62' contacting the projection 64'. The control valve 2 will remain closed during the entire time the sprinkling system is not in operation, and no pressure fluid may reach the control pipe 6. If it is desired to institute a new sprinkling cycle, the hand knob 58 will again have to be rotated in counter-clockwise direction as previously described.

It is apparent that each of the several timing discs 67 (three in this case) will result in a sprinkling period of different duration, due to the different length of the lobes 79 on each disc. As was explained previously, any one of the timing discs 67 may be selectively moved into position opposite the disc 76 by manually rotating the hand knob 74.

In the modified form, illustrated in Fig. 11, in which the service valve 48 and the valve actuating head 49 are separated, the operation of both these units is identical with the operation of the service valve 4. Pressure fluid from the control pipe 3' enters the chamber 92 by way of the bore 93 to actuate the indexing plunger 20 (not shown). Whenever the pilot valve 22' is depressed, the supply port 46' is closed and the bleeder port (not shown) is opened. This permits pressure fluid within the chamber 18' of the service valve 48 to escape into the atmosphere by way of the tubing 50, the bleeder port, and finally the opening 94 in the hood 39'.

It should be understood that in any complete system the number of ratchet teeth 27 as well as the number of pins 36 and also the number of lobes 79 on the timing disc would have to be identical with the number of service valves in the system.

It should also be pointed out here that the control valve 2 may be substituted by a conventional manually operated valve which is operated by turning a hand wheel attached to a screw. The operation of the service valves would remain as previously described. The control head 52 would then be eliminated.

All such changes, modifications and adaptations as come within the scope of the appended claims are embraced thereby.

Having thus described my invention, I claim:

1. In a system for sequential operation of service valves: a control pipe, a control valve connecting the fluid supply to said control pipe, a plurality of service valves connected to said control pipe, means for periodically opening and closing said control valve, and actuating means within said service valves for opening and closing the latter, one at the time, each time said control valve opens and closes.

2. A system for sequential operation of valves, comprising a plurality of service valves, all connected to a control pipe, a control valve connecting said control pipe to the fluid supply, timing and actuating means associated with said control valve for periodically opening and closing the latter, actuating means associated with each service valve for opening and closing same, one at the time, each time said control valve opens and closes.

3. In a system for sequential operation of service valves: a control valve connecting a supply main to a control pipe, a plurality of service valves connected to said control pipe, actuating means associated with said service valves for opening and closing one of the latter each time said control valve is opened and closed, said actuating means being arranged to control the opening and closing function of said service valves in sequence.

4. In a system for sequential operation of valves: a control valve connecting a supply main to a control pipe, a plurality of service valves connected to said control pipe, actuating means associated with said service valves for opening and closing the latter in sequence each time said control valve opens and closes; said actuating means including a pilot valve and indexing means, the latter being operated by the pressure fluid in said control pipe and a spring enclosed within said actuating means, which in turn is arranged to operate said pilot valve and control the operation of said actuating means.

5. In a system for sequential operation of valves: a control valve connecting a supply main to a control pipe, means for periodically opening and closing said control valve to permit pressure fluid to enter said control pipe, a plurality of service valves connected to said control pipe, said service valves including a hydraulic operating means for opening and closing said service valves, a pilot valve arranged to connect said hydraulic operating means to either the pressure fluid in said control pipe or to the atmosphere; said service valves being arranged to close when said hydraulic operating means is connected to the pressure fluid and to open when connected to the atmosphere.

6. In a system for a sequential operation of service valves: a control valve connecting a supply main to a control pipe, means for periodically opening and closing said control valve to permit pressure fluid to enter said control pipe, a plurality of service valves connected to said control pipe, said service valves including a hydraulic operating means for opening and closing said service valves, a hydraulically actuated indexing means arranged to be operated each time said control valve opens and closes, a pilot valve to be periodically actuated by said indexing means and arranged to control the functioning of said hydraulic operating means.

7. In a system for sequential operation of service valves: a control valve connecting a supply main to a control pipe, means for periodically opening and closing said control valve to permit pressure fluid to enter said control pipe, a plurality of service valves connected to said control pipe, said service valves including a valve member, a longitudinal bore through said valve member, a hydraulic operating means for actuating said valve member to open and close said service valve, an indexing means operated by pressure fluid from said control pipe flowing through said longitudinal bore and arranged to be indexed each time said control valve opens and closes, a pilot valve to be periodically actuated by said indexing means and arranged to control the functioning of said hydraulic operating means by the pressure fluid flowing through said longitudinal bore.

8. In a system for sequential operation of service valves: a control valve connecting a supply main to a control pipe, means for periodically opening and closing said control valve to permit pressure fluid to enter said control pipe, a plurality of service valves connected to said control pipe, an equal number of valve actuating devices, one for each service valve, also connected to said control pipe; said service valves comprising hydraulic operating means for opening and closing said service valves; a tubing connecting each of said service valves with a different valve actuating device, the latter devices comprising each a rotary member, a hydraulic means for indexing said rotary member each time said control valve opens and closes, a pilot valve to be periodically actuated by said rotary member to control the opening and closing function of said service valves in such a manner that all of the latter in said system operate in sequence.

9. In a system for sequential operation of service valves: a control valve connecting a supply main to a control pipe, means for periodically opening and closing said control valve to permit pressure fluid to enter said control pipe, said service valves comprising hydraulic operating means for opening and closing same, pilot valves arranged to control the functioning of said hydraulic operating means, and rotary members arranged to operate each time said control valve opens and closes and to actuate said pilot valves in sequence to open and close said service valves.

10. In a system for a sequential operation of service valves: a control valve actuated by a hydraulic operating means and connecting a supply main to a control pipe, timing and actuating means associated with said control valve for periodically opening and closing the latter to permit pressure fluid to enter said control pipe, a plurality of service valves connected to said control pipe and arranged to operate in sequence whenever the pressure in said control pipe is periodically increased and decreased; said timing and actuating means comprising a spring motor, a pilot valve arranged to control the functioning of said hydraulic operating means, and a plurality of timing discs driven by said spring motor for actuating said pilot valve, and manual means for selectively bringing any one of said timing discs into operating position with said pilot valve.

11. A valve, comprising a valve member provided with a longitudinal bore always in communication with the pressure port of said valve, hydraulic operating means for actuating said valve member to open and close said valve, a pilot valve arranged to control the functioning of said hydraulic operating means, a rotary member, and hydraulic means for indexing said rotary member every time the pressure in said longitudinal bore is increased and then decreased beyond a predetermined amount, said rotary member being arranged to periodically actuate said pilot valve and thereby causing said hydraulic operating means to open or close said valve.

FRED HAUSER.